(12) United States Patent
Prock

(10) Patent No.: US 10,610,940 B2
(45) Date of Patent: Apr. 7, 2020

(54) METHOD AND DEVICE FOR PRECISION MACHINING OF TOOTHED AND HARDENED WORK WHEELS

(71) Applicant: Profilator GmbH & Co. KG, Wuppertal (DE)

(72) Inventor: Erich Prock, Ravensburg (DE)

(73) Assignee: Profilator GmbH & Co. KG, Wuppertal (DE)

( * ) Notice: Subject to any disclaimer, the term of this patent is extended or adjusted under 35 U.S.C. 154(b) by 0 days.

(21) Appl. No.: 15/560,841

(22) PCT Filed: Mar. 3, 2016

(86) PCT No.: PCT/EP2016/054568
§ 371 (c)(1),
(2) Date: Sep. 22, 2017

(87) PCT Pub. No.: WO2016/150674
PCT Pub. Date: Sep. 29, 2016

(65) Prior Publication Data
US 2018/0111209 A1  Apr. 26, 2018

(30) Foreign Application Priority Data

Mar. 24, 2015  (DE) .................. 10 2015 104 404
Nov. 2, 2015   (DE) .................. 10 2015 118 721
Nov. 26, 2015  (DE) .................. 10 2015 120 556

(51) Int. Cl.
*B23F 5/02*     (2006.01)
*B23F 5/16*     (2006.01)
(Continued)

(52) U.S. Cl.
CPC .............. *B23F 21/005* (2013.01); *B23F 5/02* (2013.01); *B23F 5/16* (2013.01); *B23F 5/163* (2013.01);
(Continued)

(58) Field of Classification Search
CPC ........ B23F 21/005; B23F 21/03; B23F 5/163; B23F 23/1225; B23F 23/1281; B23F 5/02;
(Continued)

(56) References Cited

U.S. PATENT DOCUMENTS 3,897,661 A * 8/1975 Inatomi ..................... B23F 5/04
                                                       451/47
4,171,558 A * 10/1979 Igrashi ................ C10M 169/04
                                                       29/893.35
(Continued)

FOREIGN PATENT DOCUMENTS

DE    2654177 A1   6/1978
DE    3533064 A1   3/1987
(Continued)

OTHER PUBLICATIONS

International Search Report and Written Opinion Application No. PCT/EP2016/054568 Completed Date: May 19, 2016; dated May 31, 2016 12 Pages.
(Continued)

*Primary Examiner* — Eileen P Morgan
(74) *Attorney, Agent, or Firm* — Whitmyer IP Group LLC

(57) ABSTRACT

A method for machining toothed and hardened work wheels, includes: mounting a work wheel that is hardened and pre-toothed with an allowance onto a workpiece spindle; removing at least 50% of the allowance by means of gear skiving with a skiving wheel that is rotatably driven by a tool spindle; precision-machining the work wheel in unchanged tension by means of a honing wheel. The forward movement occurs during gear skiving in the extension direction of the toothing. The delivery of the workpiece that is moved in an oscillating manner in the extension direction of the toothing occurs during honing in the radial direction. The skiving wheel and the honing wheel are driven by a common tool (Continued)

spindle. A device for carrying out the method includes a workpiece spindle, which is driven to rotate, and a tool spindle, which carries a combination tool having a skiving wheel and a honing wheel.

8 Claims, 1 Drawing Sheet

(51) Int. Cl.
    *B23F 17/00*     (2006.01)
    *B23F 23/12*     (2006.01)
    *B23F 21/03*     (2006.01)
    *B23P 15/14*     (2006.01)
    *B23F 21/00*     (2006.01)
    *B23P 13/02*     (2006.01)

(52) U.S. Cl.
    CPC .......... *B23F 17/00* (2013.01); *B23F 17/006* (2013.01); *B23F 21/03* (2013.01); *B23F 23/12* (2013.01); *B23F 23/1225* (2013.01); *B23F 23/1281* (2013.01); *B23P 13/02* (2013.01); *B23P 15/14* (2013.01)

(58) Field of Classification Search
    CPC .......... B23F 5/16; B23F 17/00; B23F 17/006; B23F 23/12; B23P 13/02; B23P 15/14
    USPC ...................................... 451/47, 51
    See application file for complete search history.

(56) References Cited

U.S. PATENT DOCUMENTS

| | | | | |
|---|---|---|---|---|
| 5,136,522 A * | 8/1992 | Loehrke | ............... | G05B 19/186 700/164 |
| 5,857,896 A * | 1/1999 | Stollberg | ............. | B23F 17/006 451/21 |
| 6,350,181 B1 * | 2/2002 | Wirz | ....................... | B23B 23/04 451/147 |
| 6,390,893 B1 * | 5/2002 | Stadtfeld | ............... | B23F 17/001 451/161 |
| 8,444,781 B1 * | 5/2013 | Anderson | ................ | C21D 7/13 148/559 |
| 8,732,937 B2 * | 5/2014 | Prock | ..................... | B23F 5/163 29/50 |
| 2004/0219051 A1 * | 11/2004 | Sonti | ..................... | B21H 5/022 419/31 |
| 2005/0133120 A1 * | 6/2005 | Walenta | ................... | C21D 1/06 148/233 |
| 2013/0149061 A1 * | 6/2013 | Glasow | .................. | B23F 17/00 409/38 |
| 2015/0338201 A1 * | 11/2015 | Wuerfel | .................... | G01B 5/24 700/160 |
| 2016/0016242 A1 * | 1/2016 | Stadtfeld | ................ | B23F 21/04 409/36 |
| 2017/0008106 A1 * | 1/2017 | Wuerfel | ............... | B23F 23/003 |

FOREIGN PATENT DOCUMENTS

| | | |
|---|---|---|
| DE | 3930322 C1 | 9/1990 |
| DE | 19625520 C1 | 6/1997 |
| DE | 10305752 A1 | 10/2004 |
| DE | 102011118702 A1 | 5/2012 |
| EP | 0282046 A2 | 9/1988 |

OTHER PUBLICATIONS

Translation of International Search Report and Written Opinion Application No. PCT/EP2016/054568 Completed Date: May 19, 2016; dated May 31, 2016 3 Pages.

* cited by examiner

METHOD AND DEVICE FOR PRECISION MACHINING OF TOOTHED AND HARDENED WORK WHEELS

TECHNICAL FIELD

The invention relates to a method and a device for machining toothed and hardened work wheels as well as a tool which is usable in this regard.

BACKGROUND

Hardened gearwheels are manufactured by a plurality of successive operations. First, a blank made of unhardened steel is provided with internal or external toothing by one of the many methods known from the state of the art. This can take place by ramming, gear hobbing or gear-skiving. The pre-toothed work wheel is hardened next. After being hardened, precision machining is performed by honing/grinding. Precision machining is carried out using a plurality of machine tools that are different from one another, such that the work wheel is rechucked each time. This requires keying of the honing wheel into the tooth gaps on the toothed work wheel, for example, because the latter is chucked with a concentricity error. In precision machining, an allowance retained previously is removed from the teeth of the toothing to be fabricated. The allowance is distributed irregularly over the circumference of the work wheel due to an unavoidable chucking error and unavoidable hardening distortion.

DE 35 33 064 A1 describes a method for machining the flanks of gearwheels by gear skiving as well as a suitable device for doing so. The flanks of unhardened gearwheels, but also hardened gearwheels with straight or helical toothing, should be machined by gear skiving. Grinding or hard shaving, but also honing or precision grinding, should be replaced by gear skiving of hardened tooth flanks.

DE 103 05 752 A1 describes a combination tool for toothing of cylindrical components, wherein a skiving wheel for gear skiving and at least one shaving cutter for shaving are arranged on a common shaft so that in two successive machining steps, gear skiving can be carried out on one machine first and then shaving can be carried out without a workpiece change.

SUMMARY

The object of the invention is to improve on the manufacturing method for toothing of hardened work wheels and to provide a device in this regard and/or a tool usable for this purpose.

This object is achieved by the invention as defined in the claims. The dependent claims not only constitute advantageous refinements of the independent claims but are also independent solutions to the problem.

First and essentially, it is proposed that the pre-toothed and hardened work wheel, wherein the toothing has an allowance, is chucked on a workpiece spindle. Most of the allowance, i.e., at least 50%, preferably more than 80% or more than 90% of the allowance, is removed during this chucking by gear skiving using a skiving wheel driven to rotate by a tool spindle. The allowance is greater than the hardness error and/or the chucking error, so that no air cuts are carried out in gear skiving. There is no keying to the allowance, which still remains unevenly distributed due to the process. In a subsequent precision machining step, in which the work wheel remains chucked on the workpiece spindle, the tooth flanks are subjected to precision machining by means of a honing wheel. Due to the preliminary gear skiving process, all rounding errors and hardness defects have been compensated, so that the honing wheel need not be keyed into the toothing of the work wheel. In a preferred embodiment of the method, skiving machining is carried out not in several successive steps but instead in a single cut, wherein the feed motion takes place once, namely outside of the workpiece in the profile direction, i.e., in the radial direction. However, the skiving machining may also comprise several successive steps. The forward movement then takes place when cutting is not done in the profile direction. In machining, the forward movement takes place in the direction of extent of the tooth, for example, in the axial direction in the case of straight toothing. The cut therefore advances directly into the solid material. In this skiving machining, the hardness defects and concentricity defects, in particular the concentricity defects caused by the chucking, are eliminated by removing a significant amount of the allowance. However, the toothing precision is still inadequate. Furthermore, the tooth flanks of the work wheel, which has only been hardened in gear-skiving, still does not have a sufficient surface quality. The required surface quality and/or toothing precision is/are achieved by the honing machining step. The method according to the invention thus comprises a hard-roughing step that removes a significant portion of the allowance, and a successive hard-smoothing step, wherein the roughing step is carried out by gear skiving, and the smoothing step is carried out by honing, and both of these machining steps are carried out in the same chucking of the work wheel. The roughing step preferably takes place using a hard metal skiving wheel, and the smoothing step preferably takes place with a ceramically bonded honing wheel. The machine tool has a dressing master ring with diamond-tipped teeth. The honing wheel may be a CBN tool. It is regarded as advantageous that the greatest accuracy and the best surface quality can be achieved with the method according to the invention. Due to the dressing of the honing wheel in the machine itself, negative effects of the tool due to roundness, chucking and manufacturing defects are prevented. During the forward movement in gear skiving in the direction of extent of the toothing, i.e., in the axial direction of the workpiece spindle in the case of straight toothing, the adjustment takes place in the profile direction during honing, i.e., in the radial direction. In this case, the workpiece oscillates in the direction of extent of the tooth, i.e., in the axial direction of the workpiece spindle in the case of straight toothing. The honing wheel and the skiving wheel may be formed by a combination tool. Then the honing wheel and the skiving wheel sit axially, one after the other, and are driven to rotate by a common tool spindle. However, it is also possible to use two tool spindles that are different from one another, such that the first tool spindle carries the honing wheel and the second tool spindle carries the skiving wheel. This variant is selected in particular when the use of a combination tool is impossible in a case of conflict. Both machining methods, i.e., skiving of a hardened work wheel and honing of the toothing, which has been brought to contour with a honing wheel, operate essentially by the same principle and/or with the same machine kinematics. Therefore, the two machining steps can be carried out in the same machine with adjusted rates of forward movement and cutting speeds. Each of the two method steps makes use of the advantage inherent in the method. The device according to the invention has a workpiece spindle that can be driven to rotate and has a tool spindle that can be driven to rotate. The two spindles are each driven by electric motors that are in synchronization.

An electronic control unit, which operates according to a machining program, is provided. This electronic control unit controls the rotational movement of the spindles, the adjusting movement and the forward movement. According to the invention, the electronic control unit is equipped, i.e., programmed, so that the method steps described in the introduction are carried out in the order described previously. The tool according to the invention is a combination tool. In this tool, the skiving wheel and the honing wheel are connected to one another coaxially. The skiving wheel may be arranged axially upstream from the honing wheel. The skiving wheel may have a smaller diameter than the honing wheel. The honing wheel is a dressable honing wheel, in particular a CBN honing wheel. The dressing tool used for dressing the honing wheel is part of the device. The work wheel is preferably a hardened pre-toothed gear wheel. The pre-toothing has the allowance and is preferably produced by gear skiving, for example, before the work wheel is hardened but is also produced by another method, which is mentioned in the introduction to the description. The hardened pre-toothed work wheel may be made of a case-hardened steel with a carbon content of up to 0.2%. According to other specific embodiments of the invention, however, the steel also has a carbon content of more than 0.2%. In hardening, the work wheel is heat-treated and develops a greater hardness at its surface and in the underlying structure. In a preferred variant of the invention, the pre-toothed workpiece has a surface hardness between 52 HRC and 63 HRC (hardness according to Rockwell, measured with a diamond cone). In other embodiment variants, the surface hardness may also be less than 52 HRC or even less than 45 HRC and/or more than 63 HRC. The hardness is achieved by a conversion of structure between iron and carbon during the heat treatment process. Martensite is formed and carbides are deposited. According to the invention, the hardened pre-toothing is brought to the quality ultimately required by means of hard precision working after the heat treatment and after gear skiving. The surface hardness on the flanks of the teeth may have a constant value over a certain thickness, depending on the heat treatment process and the material over a certain thickness. The invention relates to specific embodiments, in which the hardness of the workpiece decreases toward the interior of the tooth. The core hardness and/or core strength is then lower than the surface hardness and/or surface strength. In some variants of the invention, the depth of the hardness may vary. In precision machining of the work wheel, material is removed in an amount between 10 μm and 100 μm or between 10 μm and 150 μm. In one variant of the invention, it is provided that the material hardness does not change over the thickness of the allowance, such that the allowance may be in the range between 20 μm and 300 μm. The workpiece to be cut in this way should have a hardness of at least 45 HRC. According to one variant of the invention, the pre-toothed hardened blank has a tensile strength of $R_m=1430$ N/mm². According to one variant of the invention, the pre-toothed and hardened workpiece is thoroughly hardened over at least the thickness of the allowance material. The tooth flanks are formed to a certain extent by a surface zone having essentially the same hardness, which may amount to at least more than 45 HRC, with this zone having a depth measured perpendicular to the plane of extent of the tooth flank, said depth being greater than the allowance and in particular being greater than 100 μm, preferably greater than 200 μm. Both the gear-skiving machining and the precision machining thereafter thus take place in the area of the hardened surface zone, so that the surface of the tooth flanks remaining after precision machining has a hardness of at least 45 HRC, but this hardness may also be in the range of 52 HRC to 63 HRC. This method is preferably carried out using a combination tool, with which a skiving wheel and a honing wheel are mounted on a common driveshaft, such that the skiving wheel and the honing wheel have a fixed angle-of-rotation position relative to one another. In traditional honing for correction of hardness defects, new toothing is introduced into the workpiece to some extent, whereas only the contour deviations still present after hard skiving are worn away in the honing machining step according to the invention. These deviations from the ideal contour are essentially the peaks of surface elevations. The valleys are preserved in honing. According to the invention, the main removal of material takes place during gear skiving of the hardened flanks. Due to this gear skiving, the flanks are brought to approximately the ideal contour, so that only the peaks of the elevations created in gear skiving are leveled, i.e., worn away, by the subsequent honing operation. Honing is used as a simple smoothing operation, in which material is not abraded over the full area of the tooth flanks but instead is abraded only on the islands protruding above the ideal contour. This reduces the heat induced in the component during machining. The precision machining step according to the invention thus takes place preferentially and without the use of a cooling medium. The gear skiving operation therefore also takes place without the use of a cooling medium. The gear skiving process also takes place without the use of a cooling medium. Since the honing wheel and the gear skiving wheel are at a predetermined angle of rotation to one another and are both mounted on the same shaft, the precision machining tool can be brought directly into the machining position after gear skiving without having to make an individual correction of the angle of rotation between the workpiece spindle and the tool spindle. The precision machining of the work wheel thus takes place not only in a different chucking by means of a honing wheel but also merely through a change in the setting of the tool spindle to the workpiece spindle after gear skiving, preferably without a relative rotation of the two spindle axes that goes beyond the known difference in the angle of rotation between the skiving wheel and the honing wheel. This method is characterized in particular by the fact that only island-like regions of the tooth flanks of the work wheel are worn away in precision machining of the work wheel, and sections of the tooth flanks remaining between the islands are not machined in precision machining.

BRIEF DESCRIPTION OF THE DRAWINGS

One exemplary embodiment of the invention explained below on the basis of the accompanying drawings, in which.

DETAILED DESCRIPTION

Figure 1:
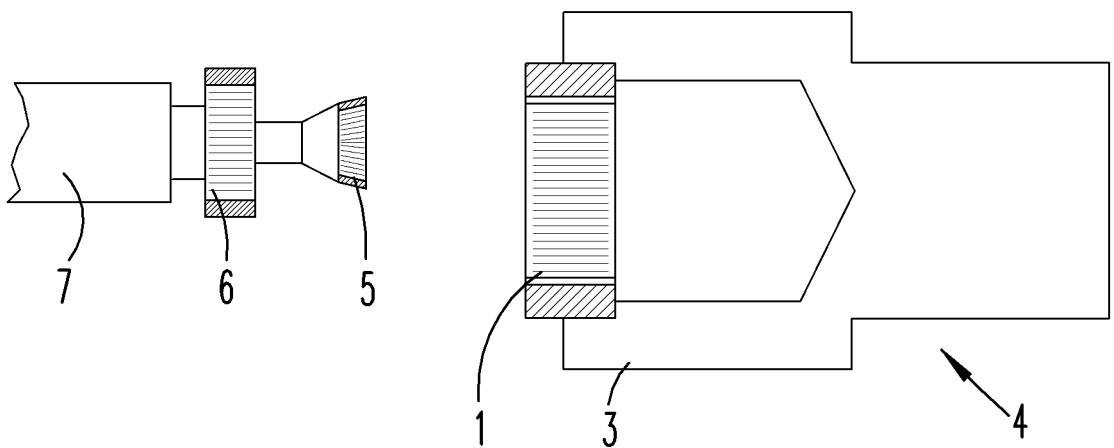
FIG. 1 shows schematically a workpiece spindle 4 with a chuck 3, which chucks a workpiece 1, and a tool spindle 7, which carries a combination tool comprising a skiving wheel 5 and a honing wheel 6.
Figure 2:
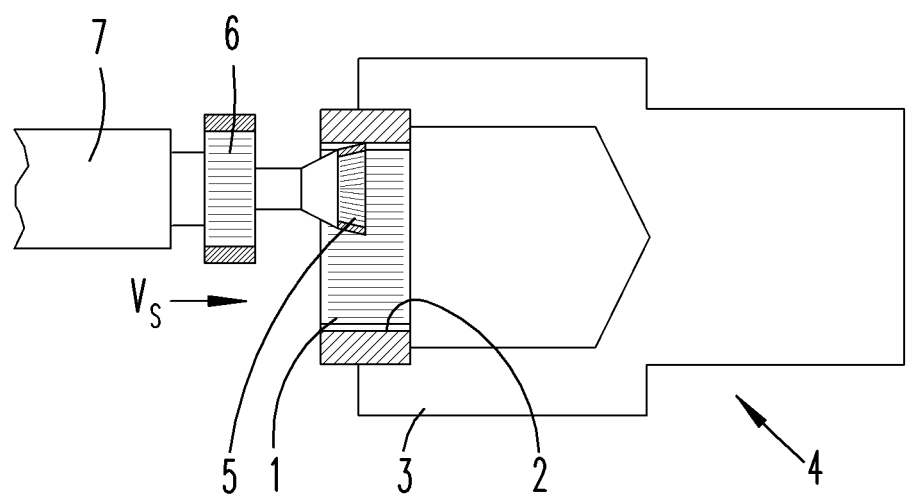
FIG. 2 shows a diagram according to FIG. 1 in skiving machining.
Figure 3:
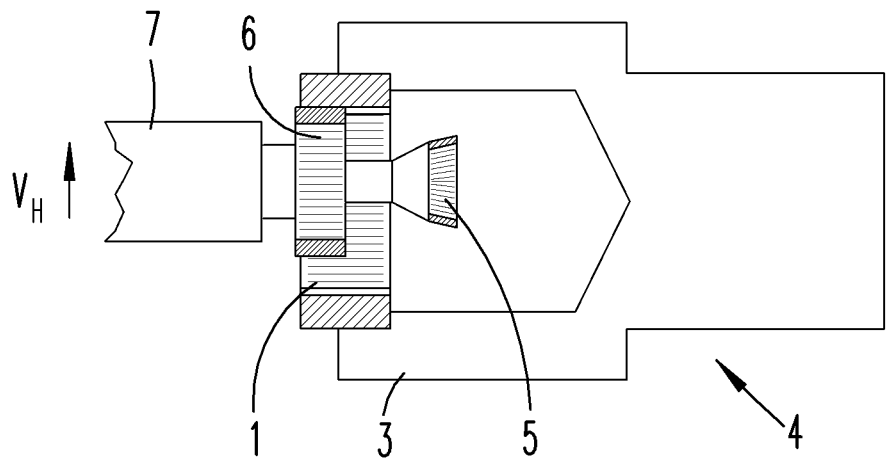
FIG. 3 shows a diagram according to FIG. 1 in honing machining.

The drawings show only details of a machine tool according to the invention. The machine tool according to the invention has a machine bed (not shown in the drawings) and a housing. Inside the housing there is a workpiece spindle 4, which is driven to rotate by an electric motor. In addition, a tool spindle 7 is also provided, with a skiving tool 5 and a honing tool 6 mounted thereon. The skiving tool 5 is preferably a hard metal skiving wheel, which is arranged coaxially with a honing wheel 6, preferably made of CBN. The tool spindle 7 is driven by an electric motor. The electric motors are synchronized with one another in such a way that the workpiece spindle 4 and the tool spindle 7 can be driven to rotate in synchronization. In addition, drives, which permit an adjustment and a forward movement, are also provided. All the drives are driven by an electronic control unit. The electronic control unit has a program memory for storage of a machining program. The machining program includes a machining method.

A work wheel 1 is prepared to carry it out the machining method. The work wheel 1 is first provided with teeth in an unhardened state. The teeth have an allowance of, for example, four to eight hundredths of a millimeter, but the allowance may also amount to only six hundredths of a millimeter. The allowance is sufficient to correct any hardness distortion and defects in shape and/or concentricity. Next, the work wheel, which has been pre-toothed in this way is hardened. This results in hardness distortion.

In a first method step, the hardened work wheel, after being pre-toothed with an allowance, is chucked on the tool spindle 4. In a second method step, most of the allowance is removed by gear skiving using the skiving wheel 5 that is driven to rotate by the tool spindle 7. The machining takes place to a certain extent into the solid material, and in a step in which all the tooth flanks of the toothing 2 of the work wheel 1 are being machined. The gear skiving machining takes place with a forward movement $V_S$ in the direction of extent of the teeth. The workpiece axis and the tool axis, i.e., the axes of rotation of the tool spindle 7 and the workpiece spindle 4, form an axle-crossing angle. There is preferably no shift in forward movement in the radial direction during gear skiving. The skiving wheel 1 may be manufactured from hard metal, ceramic or some other suitable hard material.

In a third method step, which is carried out without re-chucking of the work wheel 1, precision machining of the hard machined toothing 2 is carried out by means of gear skiving. To do so, the honing wheel 6 is brought into a machining position. During the honing machining, the work wheel 1 oscillates in the direction of extent of the teeth. The feed motion $V_H$ here is in the radial direction.

The preceding discussion serves to illustrate the inventions, which are covered on the whole by the present patent application and which reflect the prior art at least through the following combinations of features, even independently, namely:

A method for machining toothed and hardened work wheels 1, comprising the following steps:
chucking the work wheel 1, which has been pre-toothed with an allowance and hardened, on a workpiece spindle 4;
removing at least 50% of the allowance by gear skiving with a skiving wheel 5 that is driven to rotate by a tool spindle 7; and
precision machining of the work wheel 1 by means of a honing wheel 6 with no change in chucking.

A method, which is characterized in that the forward movement $V_S$ in gear skiving takes place in the direction of extent of the toothing 2.

A method, which is characterized in that the feed motion $V_H$ of the work wheel 1, which is moved by oscillation in the direction of extent of the toothing 2, is carried out in honing in the radial direction.

A method, which is characterized in that the skiving wheel 5 and the honing wheel 6 are both driven by the same tool spindle 7.

A method, which is characterized in that the skiving wheel 5 is a ceramic skiving wheel or a hard metal skiving wheel.

A method, which is characterized in that the honing wheel 6 is a ceramically bonded, dressable tool, in particular a CBN tool.

A method, which is characterized in that the gear skiving machining takes place in a single step.

A method, which is characterized in that the honing wheel 6, which is mounted on the tool spindle 7, is dressed by means of a dressing tool assigned to the device and mounted on the workpiece spindle 4 in particular.

A device, which is characterized in that the control unit is equipped so that at least 50% of the allowance can be removed by gear skiving with a skiving wheel driven to rotation by the tool spindle 7 after a work wheel 1, which has been pre-toothed with an allowance and hardened, has been chucked on the workpiece spindle 4, and then the work wheel 1 while in the same chucking is precision machined by means of a honing wheel 6 driven to rotate by one of the tool spindles.

A device, which is characterized in that the skiving wheel 5 and a honing wheel 6 sit on the same tool spindle 7.

A device, which is characterized by a dressing tool with which the honing wheel 6 that is mounted on the tool spindle 7 can be dressed.

A tool, which is characterized in that a skiving wheel 5 and a honing wheel 6 are combined coaxially and axially behind one another to form a combination tool, which can be driven to rotate by the same tool spindle 7.

A method, a device or a tool, which are characterized in that the skiving wheel 5 is a hard metal skiving wheel 5.

A method, a device or a tool, which are characterized by a ceramically bonded honing wheel 6, in particular one that can be dressed and is a CBN tool in particular.

All the features disclosed here (either separately or in any combination with one another) are essential to the invention. The full content of the disclosure of the respective/attached priority documents (photocopy of the previous patent application) is herewith included in the disclosure of the present patent application, also for the purpose of including features of these documents in the claims of the present patent application. The dependent claims with their features characterize independent refinements of the prior art according to the invention, in particular to be able to make divisional applications on the basis of these claims.

The invention claimed is:

1. A method for machining toothed and hardened work wheels, comprising the following steps:
preparing a work wheel in an unhardened state with teeth having an allowance;
hardening the work wheel to a surface hardness of at least 45 HRC, the hardening causing a hardness distortion error that is less than the allowance;
chucking the work wheel on a workpiece spindle;
removing at least 50% of the allowance by gear skiving with a skiving wheel, the skiving wheel being driven to rotate by a tool spindle; and
precision machining the work wheel with no change in chucking using a honing wheel;
wherein the skiving wheel and the honing wheel are driven by the same tool spindle, wherein a forward movement in gear skiving takes place in the direction of extent of the toothing, wherein the forward movement involves no movement in a radial direction perpendicular to the direction of extent of the toothing; and
wherein a feed motion of the work wheel with an oscillating motion in the direction of extent of the toothing is in the radial direction during the precision machining step.

2. The method according to claim 1, wherein the skiving wheel is a ceramic or hard metal skiving wheel.

3. The method according to claim 1, wherein the honing wheel is a ceramically bonded, dressable tool.

4. The method according to claim 3, wherein the honing wheel is a CBN tool.

5. The method according to claim 1, wherein the gear skiving machining takes place in a single forward movement for each tooth in the direction of extent of the toothing.

6. The method according to claim 1, wherein the honing wheel is carried by the tool spindle and is dressed using a dressing tool, which is associated with the device and is carried by the workpiece spindle.

7. A method for machining work wheels, comprising:
providing a work wheel that has been pre-toothed with teeth having an allowance;
hardening the work wheel to a surface hardness of at least 45 HRC, the hardening step causing a hardness distortion error that is less than the allowance;
chucking the work wheel on a workpiece spindle;
gear skiving the work wheel using a skiving wheel to remove at least 50% of the allowance therefrom, the gear skiving involving rotationally driving the skiving wheel with a tool spindle;
during the gear skiving step, moving the skiving wheel in a direction of an axis of the work wheel, wherein the moving step involves no movement in a radial direction perpendicular to the axis of the work wheel;
without rechucking the work wheel after the gear skiving step, precision machining the work wheel using a honing wheel, the precision machining involving rotationally driving the honing wheel with the same tool spindle that rotationally drives the skiving wheel; and
during the precision machining step, moving the work wheel in an oscillating motion in the radial direction perpendicular to the axis of the work wheel.

8. The method according to claim 7, wherein the gear skiving step takes place for each tooth during a single movement of the skiving wheel in the direction of the axis of the work wheel.

* * * * *